United States Patent [19]

Peacock

[11] Patent Number: 5,272,003
[45] Date of Patent: Dec. 21, 1993

[54] MESO TRIAD SYNDIOTACTIC POLYPROPYLENE FIBERS

[75] Inventor: Andrew J. Peacock, Houston, Tex.

[73] Assignee: Exxon Chemical Patents Inc., Linden, N.J.

[21] Appl. No.: 993,325

[22] Filed: Dec. 18, 1992

Related U.S. Application Data

[63] Continuation-in-part of Ser. No. 603,968, Oct. 26, 1990, abandoned.

[51] Int. Cl.$^5$ .............................................. D02G 3/00
[52] U.S. Cl. ................................. 428/357; 428/364; 428/365; 526/351
[58] Field of Search ............... 428/357, 364, 365, 224; 526/351

[56] References Cited

U.S. PATENT DOCUMENTS

| | | | |
|---|---|---|---|
| 3,258,455 | 6/1966 | Natta et al. | 526/351 |
| 3,396,073 | 8/1968 | Touey et al. | 428/369 |
| 4,335,225 | 6/1982 | Collette et al. | 526/351 |
| 4,560,734 | 12/1985 | Fujishita et al. | 526/348.1 |
| 4,892,851 | 1/1990 | Ewen | 502/104 |
| 5,132,381 | 7/1992 | Winter | 526/160 |

FOREIGN PATENT DOCUMENTS

| | | |
|---|---|---|
| 351391 | 1/1990 | European Pat. Off. |
| 387690 | 9/1990 | European Pat. Off. |
| 387691 | 9/1990 | European Pat. Off. |
| 414047 | 2/1991 | European Pat. Off. |
| 426637 | 5/1991 | European Pat. Off. |
| 468651 | 1/1992 | European Pat. Off. |

*Primary Examiner*—Patrick J. Ryan
*Assistant Examiner*—N. Edwards
*Attorney, Agent, or Firm*—Myron B. Kurtzman; Catherine L. Bell

[57] ABSTRACT

Syndiotactic polypropylene fibers from syndiotactic polypropylene having a melting point of from 100° C. to 160° C. and desirably a polymer having blocks of repeating racemic dyads connected predominantly by units having a meso triad or a meso dyad and methods of making such fibers. Fabrics, yarns and tows made from these fibers are useful in the production of diapers, hospital gowns, and the like.

16 Claims, 5 Drawing Sheets

MULTIPLE DIES/EXTRUDERS VERTICAL PROCESS

MESO TRIAD SYNDIOTACTIC POLYPROPYLENE FIBERS

CROSS REFERENCE

This case is a continuation in part of 07/603,968, filed Oct. 26, 1990, now abandoned.

FIELD OF THE INVENTION

The present invention relates to syndiotactic polypropylene fibers.

BACKGROUND OF THE INVENTION

An important use for polymeric fibers has been in the field of non-woven fabrics. Also yarn for woven fabric, carpet etc. Non-woven fabrics are well known in the art, as evidenced by U.S. Pat. No. 4,688,566 to Braun which describes a multilayer nonwoven fabric and in which are listed more than 90 cited references.

One of the more significant commercial applications of nonwoven fabrics is in the fabrication of disposable products intended for a single use. Typical of such products are disposable diapers, feminine care products, surgical gowns, industrial wipes, and the like. Because the nonwoven fabric is intended as a cloth substitute in these applications, extensive effort has been expended to improve the properties of nonwoven fabric to more nearly approximate that of cloth. Of particular interest has been the barrier properties and the softness of the nonwoven web, that is improving the feel or "hand" of the fabric together with lowering the resistance of the fabric to folding or bending.

SUMMARY OF THE INVENTION

It is a general object of the present invention to provide polypropylene fibers having improved properties, including an improved hand, and to provide methods of making such fibers.

It is another object to provide a nonwoven polypropylene fabric having improved softness and which requires less energy to produce and methods of making such nonwoven fabrics.

These and other objects are accomplished by the present invention which provides in one of its preferred embodiments fibers of syndiotactic polypropylene preferably having a melting point of from about 100° to about 160° C. and desirably the repeating racemic dyads are connected predominantly by units consisting of a meso triad or a meso dyad.

DETAIL DESCRIPTION OF THE EMBODIMENTS

Figure 1:
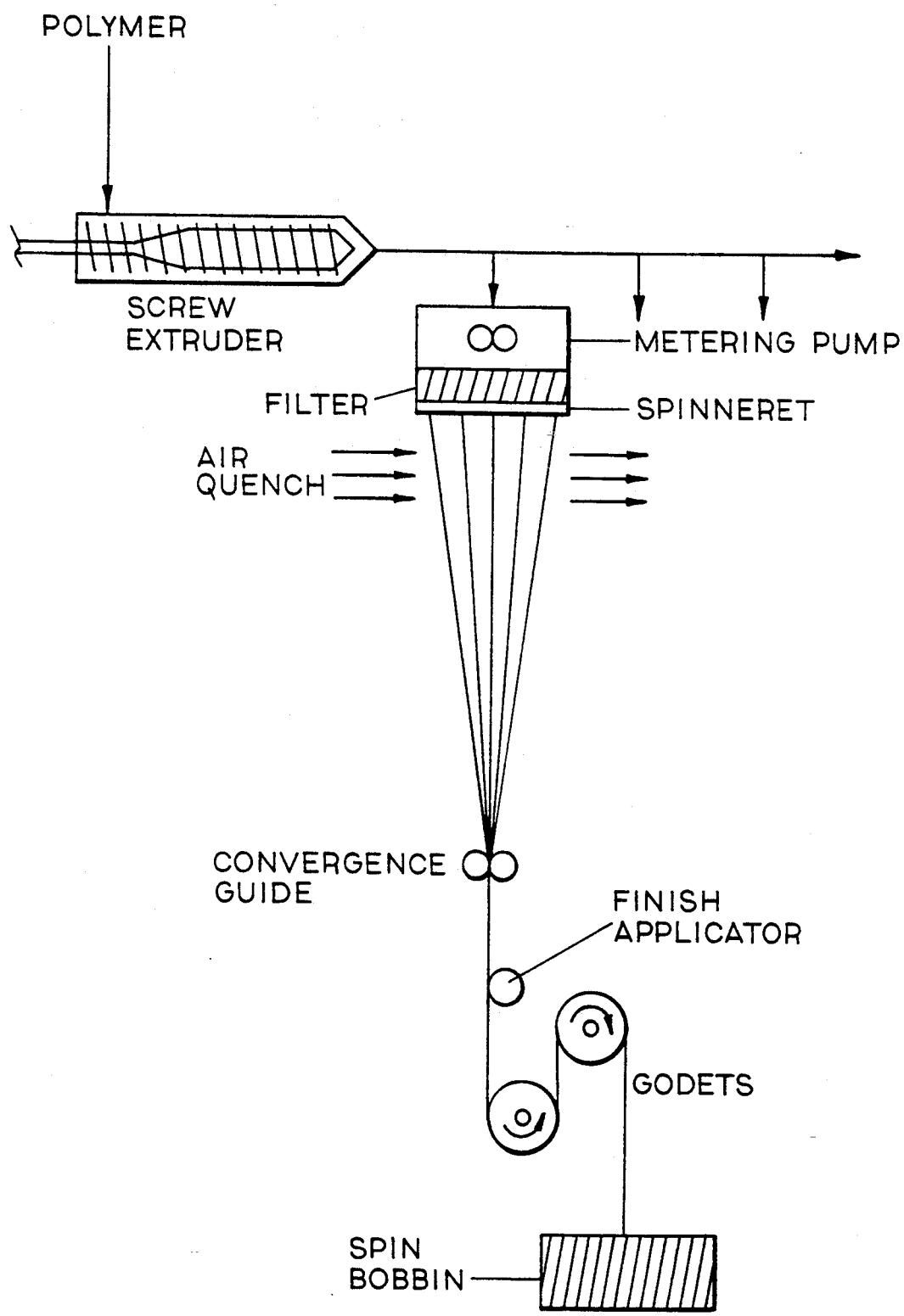
FIG. 1 is a schematic diagram of a typical melt-spinning apparatus for producing spun fibers according to the invention.

In its broadest terms, the present invention comprehends making fibers out of syndiotactic polypropylene having MP greater than 100° C.

As is known in the art, the structure of properties of syndiotactic polypropylene (SPP) differ significantly from those of isotactic polypropylene. The isotactic structure is typically described as having the methyl groups attached to the tertiary carbon atoms of successive monomeric units on the same side of a hypothetical plane through the main chain of the polymer, e.g., the methyl groups are all above or below the plane. Using the Fischer projection formula the stereochemical sequence of isotactic polypropylene is described as follows:

Another way of describing the structure is through the use of NMR. Bovey's NMR nomenclature for an isotactic pentad is . . . mmmm . . . with each "m" representing a "meso" dyad of successive methyl groups on the same side of the plane. As known in the art, any deviation or inversion of the structure of the chain lowers the degree of isotacticity and crystallinity of the polymer.

In contrast to the isotactic structure, syndiotactic polymers are those in which the methyl groups attached to the tertiary carbon atoms of successive monomeric units in the chain lie on alternate sides of the plane of the polymer. Using the Fischer projection formula, the structure of a syndiotactic polymer is designated as:

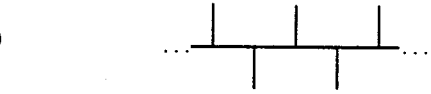

In NMR nomenclature, this pentad is described as . . . rrrr . . . in which each "r" represents a "racemic" dyad, i.e. successive methyl groups on alternate sides of the plane. The percentage of "r" dyads in the chain determine the degree of syndiotacticity of the polymer. This crystallinity distinguishes both syndiotactic and isotactic polymers from atactic polymers. Atactic polymers exhibit no regular order of repeating unit configurations in the polymer chain and form essentially a noncrystalline product.

Most of the syndiotactic polypropylene produced previously as described in such references as U.S. Pats. Nos. 3,305,538 and 3,258,455 to Natta et al have produced syndiotactic polymers having the following structure:

or in NMR nomenclature . . . rrrrrmrrrrr . . . .

The polymer chain used in producing the fibers of this invention preferably consists of blocks of repeating racemic (r) dyads predominantly connected by units consisting of meso (m) dyads, i.e., a meso triad "mm" and preferably consists of greater than 80% racemic dyads, and more preferably greater than 95% racemic dyads. A method for producing SPP of this type is described in published European patent application EP 351,391 A2, the entire disclosure of which is hereby incorporated by reference. Some catalysts which are suitable for producing the meso triad SPP of the present invention are described in U.S. Pat. No. 4,892,851 to Ewen et al., the entire disclosure of which is hereby incorporated by reference.

An important feature of syndiotactic polypropylene is that they have lower heats of fusion than the corresponding isotactic polymers. Another important feature which distinguished SPP from IP is that SPP exhibits two endothermic peaks at temperatures greater than 100° C. as determined by differential scanning calorimetry.

While syndiotactic polypropylene is known in the art, it is a different composition from isotactic polypropylene and unexpectedly gives different results in many applications. For example one would expect that both isotactic and syndiotactic polypropylene would display the same behavior when the fibers are stretched. Both isotactic and syndiotactic are believed to extend to planar zigzag formation. However, the isotactic propylene does not retract to any great extent when stretched while the syndiotactic polypropylene unexpectedly does.

Furthermore, these syndiotactic polypropylenes when spun into yarn could be used to make knitted articles. Isotactic polypropylene is known to become baggy when knitted into fabrics since it does not recover or show enough elasticity. For example isotactic polypropylene thermal underwear gets baggy at the knees and elbows, however syndiotactic polypropylene with this elastic property would recover and not be baggy. Another application would be for tie down bands, webbing or ropes for objects, such as pallets and the like. Syndiotactic polypropylene has elasticity and absorbs energy. A load could shift or expand in some manner and a syndiotactic polypropylene robe would absorb the force and not break where as an isotactic polypropylene rope would be more likely to break or develop slack due to remnant stretch when a load shifts or expands. Further, the syndiotactic polypropylene fiber/yarns can be used in carpet since they have elasticity. The carpet fibers containing syndiotactic polypropylenes that have crushed from heavy furniture being laid on them would recover faster. Syndiotactic polypropylene can also be made into tow ropes, tiedowns, surgical sutures, and the like. These syndiotactic articles typically display elasticity of at least 50% recovery 24 hours after 100% elongation, preferably 65%, more preferably 75%, even more preferably 80%.

The polymers used in the present invention's fibers generally have average molecular weights between about 50,000 and 750,000, preferably between about 50,000 and about 300,000, even more preferably between about 100,000 and about 200,000. The molecular weight of the polymer should be such that fibers having appropriate tensile strength and elongation properties can be produced from the polymer.

Depending on the application, the SPP fibers may be in the form of continuous filament yarn, monofilaments, staple fiber, tow, or top. Continuous filament yarn consists of a small number of roughly parallel, continuous, individual filaments of unlimited length held together by a slight twist or by intermingling. Staple fiber is made up of a very large number of discontinuous, randomly oriented, individual fibers. It may be subjected to a series of processes, including in spinning to yarn. The precursor to staple fiber is tow, which consists of a large number of roughly parallel, continuous filaments. It is converted by cutting or breaking into staple fiber or into a top or sliver, intermediate stages between staple fiber and yarn.

The fibers of the invention may also be monofilaments which are single filaments of yarn which are generally greater in diameter than those present in continuous filament and staple yarn.

The size of the fibers is typically from about 0.015 to about 0.15 denier. Melt blown fiber can be from 0.015 to 0.15 and spunbond from 1.5 to 20 denier and desirably 1.5 to 3 denier.

The fibers for making the nonwoven fabric of the invention may be made in a number of ways. For example the SPP fibers may be produced by melt blowing, melt spinning, spunbonding, used to make nonwoven fabric drawing, or slitting and fibrillating film.

In melt spinning, as shown in FIG. 1, the SPP is generally melted using one or more screw extruders. The extruder delivers molten SPP at a constant rate into a filter assembly. In the filter assembly the molten SPP is filtered through a series of sintered or fibrous gauzes or a bed of grade fine refractory material, such as sand or alumina, held in place by metal screens. Filtration removes large solid or gel particles that might otherwise block spinneret holes or, if passed through occupy sufficient cross-sectional area in the fiber to affect its processing or tensile properties. Filtration also provides shearing, and thus can influence rheological behavior.

After filtration, the molten polymer passes to the spinneret through a distribution system, arranged to maximize mixing, equalize temperature, and minimize stagnancy. The filter and spinneret are normally mounted in the same assembly, known as a pack. Dynamic mixers, static mixers, or flow inverters are sometimes included in the spinning apparatus to improve the homogeneity of the molten SPP between spinning positions.

Spinnerets for continuous yarn production may have up to about 500 holes, most commonly 50 to 200, and those for tow or staple fiber may have thousands. For continuous yarn or staple fiber production, the spinneret holes measure between 0.3–0.5 mm in diameter.

For monofilaments, the spinnerets typically have only a few relatively large holes, from 1 to 4 mm in diameter. The spinneret holes for monofilaments are usually round, but may have other cross sections, e.g., multilobal or rectangular.

Typical extrusion temperatures for SPP are from 225° to 300° C. The actual temperature used is dependent on the size of the polymer with larger lighter molecular weight polymers requiring higher temperatures to achieve a sufficiently low melt viscosity for extrusion.

As molten SPP passes through a spinneret hole, it is drawn away and attenuated by a draw-down force applied by a forwarding or windup roll; simultaneously its temperature rapidly decrease. The diameter of the fiber immediately below the hole and before attenuation begins may be larger than the hole diameter. This so-called die swell is due to relaxation of the viscoelastic stress induced in the hole.

In the case of continuous yarn, after spinning the fiber, it is cooled, generally by blowing cool air on the fiber.

In the case of monofilaments, because heat removal is more of a problem, the fiber is usually quenched by passing it into cold water or on to a cold quench roll immediately after extrusion.

For continuous yarn, the orientation of the spun yarn depends upon the speed at which it is forward spun. Generally, speeds below about 1500 m/min are employed to make spun yarn of low orientation and above about 2500, m/min to make partially oriented yarn. The orientation increases progressively up to about 6000 m/min. At higher speeds, other stress-induced processes prevent further orientation.

SPP fibers having a low orientation must be drawn to a relatively high draw ratio (4–7) to produce so-called fully oriented yarn. Drawing may be carried out as a separate step in which the spun yarn is first wound up onto a bobbin, or it may be integrated with spinning as a spin-draw process in such a way that the yarn is removed from the spinning zone relatively slowly, forwarded to a drawing zone (or two or more successive drawing zones) in which it oriented, and finally wound up at a high speed, e.g., 6000 m/min.

Partly oriented yarn (POY), the feedstock for draw texturing or warp drawing (draw beaming), is usually wound up at speeds of 2500–4000 m/min. spin-draw processes for untextured filament yarns may also be based upon forwarding partly oriented yarn from the spinning zone at speeds of this order, drawing them in line to a draw ratio of 1.5–2, and finally winding up at about 6000 m/min. Integrated spin-draw-texture processes may also be carried out. Highly oriented yarns can be wound up directly from the spinning zone at very high speeds up to 6000 re/min; such yarns can be used in textiles without further drawing, but the orientation is generally not as high as that achieved by a two stage process with high draw ratio.

In spinning tows for conversion into staple fiber or tops, the numbers of fibers from a single spinneret may be several thousand. The fibers from a large number of individual spinnerets are converged by forwarding them together from capstan rollers as a large tow, which is collected by forwarding it into a transfer can and transported to a separate drawing stage.

Because SPP is soluble in xylene at a temperature below that which isotactic polypropylene is soluble, SPP may also be conveniently spun from a xylene-SPP solution to produce a fiber. SPP fibers may also be spun from solutions of SPP in other organic solvents.

Figure 2:
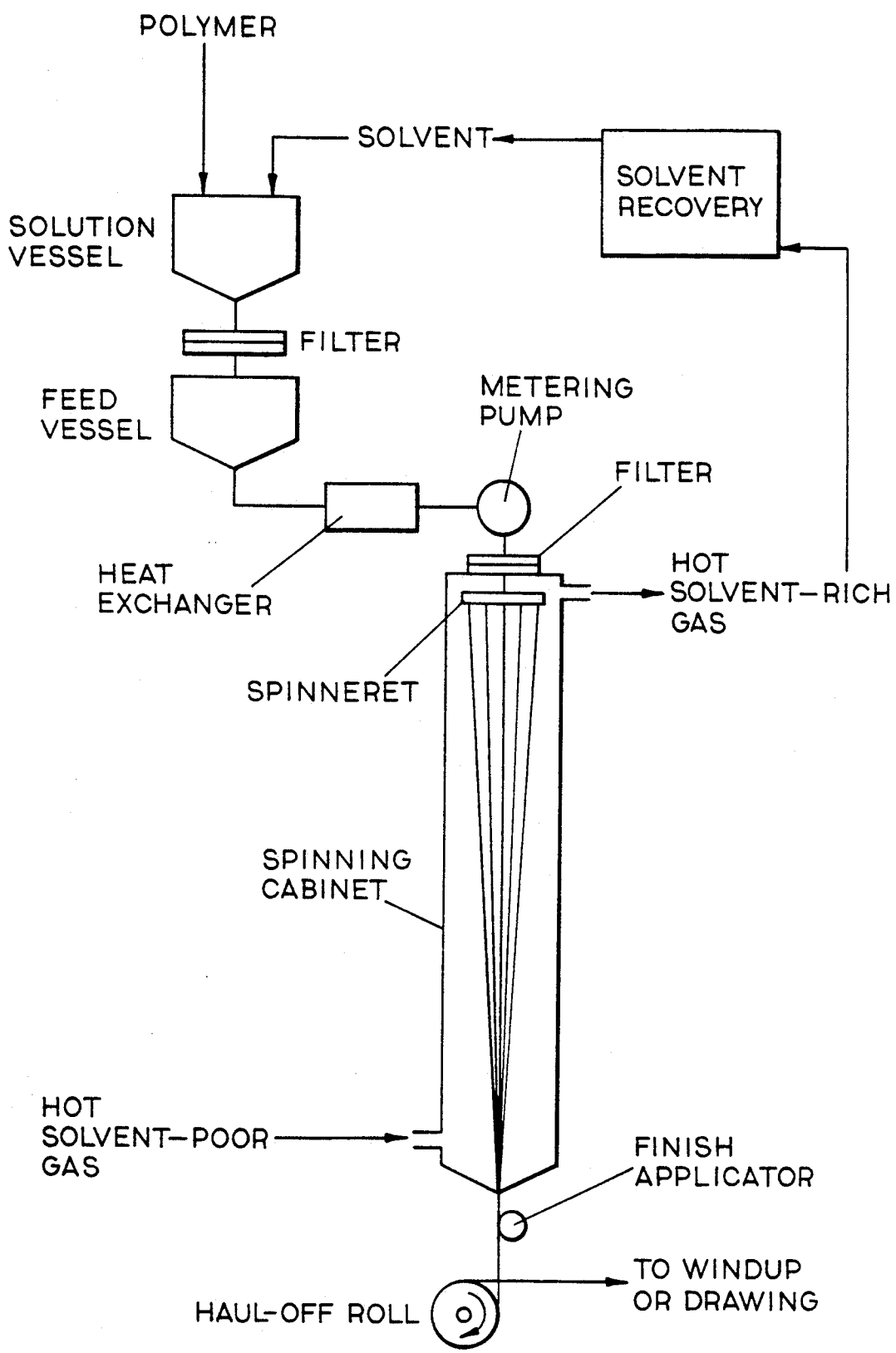
FIG. 2 is a schematic diagram of a typical solution-spinning apparatus for producing spun fibers according to the invention.

In solution spinning, as shown in FIG. 2, the SPP solution is extruded from a spinneret through a zone in which the solvent is rapidly evaporated, leaving filaments that are wound up at speeds up to about 1000 re/min. Before extrusion the solution is heated to a temperature just above the boiling point of the solvent. The evaporation zone consists of a vertical enclosed cell 3–10 m high, through which heated gas is passed. For a low boiling solvent, a flow of unheated gas may be used.

As illustrated in FIG. 2, the equipment for solution delivery typically consists of a solution vessel, filtration pump, dearation vessel, metering pump, and spinnerets. The solution is heated by passage through a heat exchanger before extrusion. The concentration of the solution at room temperature is normally about 1 wt. % to about 50 wt. %. The solution passes through the spinneret holes into a spinning cell. The gas or vapor used to evaporate the solvent, preheated if necessary, is introduced into the spinning cell at one end, flows through the cell in contact with the filaments, and emerges solvent-rich at the other end. The gas flow is generally countercurrent to that of the yarn to reduce the amount of solvent in the yarn emerging from the cell. However, concurrent gas flow may offer advantages in terms of reducing turbulence and reducing the variation in filament diameter.

For reasons of economy, the gas used in the system is normally air, but inert gases such as nitrogen or carbon dioxide or mixture of the two, superheated steam, or superheated solvent vapor may also be used.

Solution spinning may be done at a low concentration (1–2%) or high concentration (10–50%) of solvent in the fiber leaving the cell. The solvent concentration can affect stretching or drawing processes. At high solvent concentration the fibers are plasticized, and effective stretching must be carried out at a lower temperature than on unplasticized fibers. Residual solvent is removed by washing before, during or after stretching the filaments and recovered by distillation.

Figure 3:
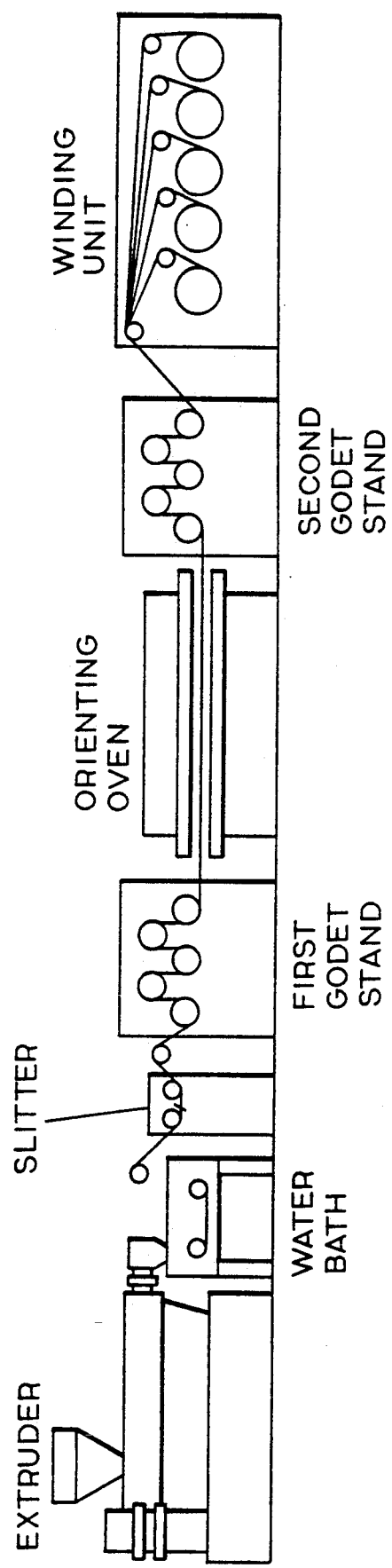
FIG. 3 is a schematic diagram of a typical flat-film apparatus for producing fibers according to the invention.
Figure 4:
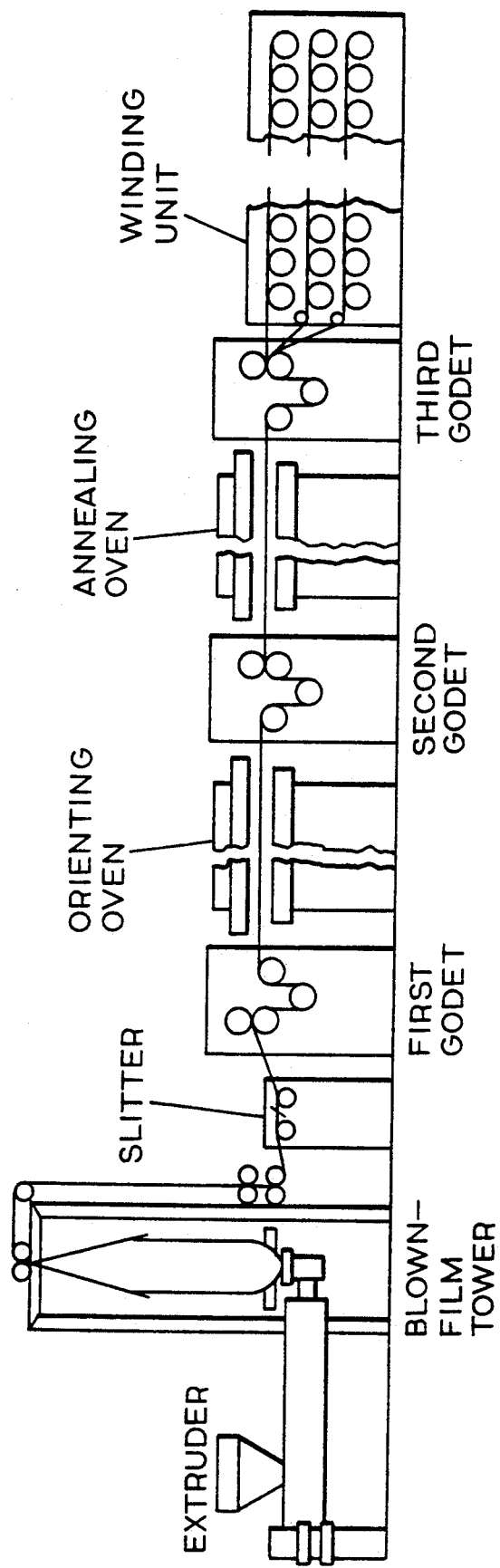
FIG. 4 is a schematic diagram of a typical blown-film apparatus for producing fibers according to the invention.
Figure 5:
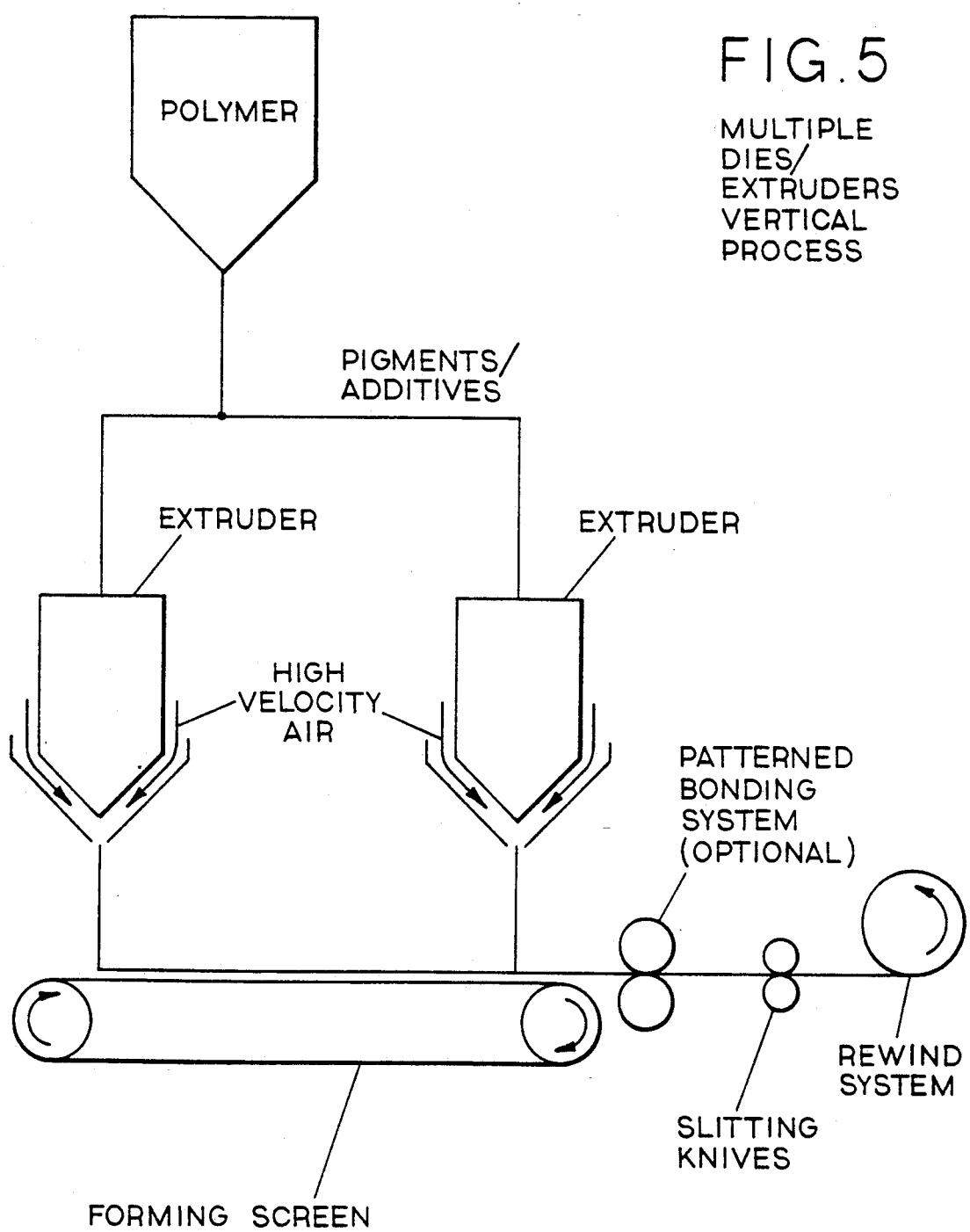
FIG. 5 is a schematic diagram of a typical melt-blowing apparatus or spunbond apparatus.

SPP fibers may also be produced from an extruded film of SPP that has been mechanically slit and fibrillated. The starting film of SPP may be a flat film that is extruded through a flat die and is either water-bath cooled or chill-roll cooled, or it may be a blown film that is extruded through an annular die and air-cooled. A flat film apparatus is illustrated in FIG. 3 and a blown-film apparatus is shown in FIG. 4. After the film is extruded, it is slit into widths of 1 to 10 mm for textile uses or 15–35 mm for rope production. Slitters essentially are bars that are equipped with razor blades which are set at a desired spacing. At the slitting stage, various fibrillation pretreatments may be used, e.g., film perforation by knife, needle, or pin roller. The slit tapes then are drawn (oriented) in an oven to develop the molecular orientation necessary to produce acceptable properties in the fibers produced. For many fibrillation techniques, a very high draw ratio, e.g., 11:1 is necessary. Fibrillation may be followed by annealing primarily to control heat shrinkage. A certain amount of relaxation, to about 15%, may be allowed in this step. The splitting or slitting of film tapes into interconnected networks of fibers usually is accomplished after tape stretching. Typical processes for producing uncontrolled fibrillation include purely mechanical shearing with rotating brushes or rubber coated rollers, bending operations, and twist operations. The fibrillation may be controlled by profiling the film at the extruder die or immediately thereafter, after which mechanical working is applied. Regular film perforation may also be applied prior to drawing to control fibrillation.

SPP fibers may be used in various types of applications including yarns, tows, nonwoven fabrics and woven fabrics. In particular nonwoven fabrics made from these monofilaments have the advantage over nonwoven fabrics made from other types of polypropylene monofilaments of having a softer feel or "hand". Also, because SPP has a lower melting temperature than isotactic polypropylene, a non-woven fabric made from spun bond SPP may be adhered to a second piece of nonwoven fabric using a lower temperature, for production of the fiber.

In addition to nonwoven fabrics, woven fabrics may be made from the SPP fibers of the invention using conventional textile machinery.

One type of medical gown using PP spunbond and melt blown fabrics is a 3-layer laminated construction known as SMS (spunbond-melt blown-spunbond). The two outerlayers are spunbonded PP fabric and the inner layer is a melt blown PP web. The inner melt blown layer provides a barrier against fluids.

A diaper or incontinence product sized for infants or adults, in which the top sheet consists of a spunbonded melt blown, or carded bonded staple nonwoven fabric prepared of the described polymer. The top sheet may be adhered to the assembly by various bonding means including adhesives, heat bonding, or ultrasonic welding. A liquid transfer layer comprising spunbonded melt blown or carded bonded nonwoven fabrics prepared of subject polymer may be fitted between the top sheet and absorbent core material.

EXAMPLE 1

Syndiotactic Polypropylene Fiber Recovery cf Isotactic Polypropylene rope cable tow ropes, surgical sutures, fishing line and any application where energy absorbance in the fiber would be of use. For example nylons, hosiery, carpet fiber and fishing line all require energy absorbancy or elastic recovery. Syndiotactic polypropylene and also be extruded to form a sheet and slit into bands suitable for pallet bonding. The fibers could then be spun bond or melt blown into a fabric.

The fabric could then be incorporated into an article such as the structure of a disposable diaper or a gown suitable for medical applications.

As is apparent from the foregoing description, the materials prepared and the procedures followed relate to specific embodiments of the broad invention. It is apparent from the foregoing general description and the specific embodiments that, while forms of the invention have been illustrated and described, various modifications can be made without departing from the spirit and scope of this invention. Accordingly, it is not intended that the invention by limited thereby.

TABLE 1

| Material | Equipment | Take up rate | Cold drawn | Sample designation | Fiber diameter | Force required to deform fiber to 50% (lb) | Permanent set immediately after elongation to 50% (%) | Force required to deform fiber to 100% (lb) | Permanent set immediately after elongation to 100% (%) | Permanent set 24 hours after elongation to 100% (%) |
| --- | --- | --- | --- | --- | --- | --- | --- | --- | --- | --- |
| SPP | Fast Test | 300 rpm | No | SPPF300 | 0.0035 | 0.065 | 17 | 0.105 | 50 | 32 |
| SPP | Fast Test | 500 rpm | No | SPPF500 | 0.002 | 0.08 | 12 | Broke | Broke | Broke |
| SPP | Hills | | Yes | SPPF651 | 0.005 | 0.17 | 14 | 0.73 | 29 | 1 |
| SPP | Hills | | Yes | SPPF652 | 0.003 | 0.07 | 13 | 0.26 | 24 | 3 |
| SPP | Hills | | No | SPPF653 | 0.0045 | 0.11 | 12 | 0.28 | 26 | 8 |
| IPP | Fast Test | | No | IPPF | 0.0025 | 0.27 | 38 | 0.27 | 86 | 67 |
| IPP | | | | IPPFHD Hard elastic | 0.0015 | 0.029 | 3 | 0.034 | 5 | 2 |

Syndiotatic polypropylene (sPP) fibers were spun from sPP having a melt flow rate (MFR) of approximately 8 and comprising 93% racemic placements and 78% racemic pentads.

The sPP was spun using two types of apparatus, a single spinnerette "Fast Test" instrument and a multi-spinnerette tall stack fiber line made by Hills Research. In the Fast Test experiment the take up rate was varied from 300 to 500 RPM to control the diameter of the fibers. The diameter of the fibers made on the Hills Research equipment was also controlled by varying the take up rate, but this went unrecorded. Some of the fibers made on the Hills Research equipment were cold drawn to their natural draw ratio after spinning.

For comparison isotactic polypropylene (iPP) was also spun to the Fast Test instrument. The iPP used was a commercial spun bond grade, PP3445 ™, manufactured by Exxon Chemical Company. This material had an MFR of approximately 35.

"Hard Elastic" iPP fibers were also tested

For the purposes of comparison, 2" lengths of each fiber were drawn at 2"/minute to either 50% or 100% elongation whereupon the tension was released at a similar rate allowing the fiber to relax. The permanent set of fibers drawn to 50% elongation was measured immediately after relaxation. For the fibers drawn to 100% the permanent set was measured immediately after relaxation and again after approximately 24 hours. The data are presented in Table 1.

Oriented syndiotactic polypropylene or spun syndiotactic polypropylene can be elongated to 100% strain before breakage. These fibers can be spun into twine

What is claimed is:

1. Fibers of syndiotactic polypropylene which consists of a polymer chain of blocks of repeating racemic dyads predominantly connected by meso triads, said polypropylene having a melting point of from about 100° C. to about 160° C., and having at least 65% recovery 24 hours after the fiber was elongated to 100%.

2. The syndiotactic polypropylene fibers according to claim 1, wherein said fibers are in the form of monofilaments.

3. The syndiotactic polypropylene fibers according to claim 1, wherein said fibers are in the form of a yarn.

4. The syndiotactic polypropylene fibers according to claim 1, wherein said fibers are in the form of staple fibers.

5. The syndiotactic polypropylene fibers according to claim 1, wherein said fibers are in the form of a tow.

6. The syndiotactic polypropylene fibers according to claim 1, wherein said polymer chain has an average molecular weight of between about 50,000 and about 200,000.

7. A nonwoven fabric comprising a plurality of continuous syndiotactic polypropylene fibers, said syndiotactic polypropylene consisting of a polymer chain of blocks of repeating racemic dyads, predominantly connected by meso triads, said polypropylene having a melting point of from about 100° C. to about 160° C. and having at least 50% recovery 24 hours after the syndiotactic fibers were elongated to 100%.

8. Fibers of syndiotactic polypropylene consisting of a polymer chain of blocks of repeating racemic dyads predominantly connected by meso triads, said polypropylene having a melting point of from about 100° C. to about 160° C. and having at least 50% recovery 24 hours after the syndiotactic fibers were elongated to 100%.

9. The syndiotactic polypropylene fibers according to claim 1, wherein said polymer chain has an average molecular weight of between about 50,000 and about 300,000.

10. A nonwoven fabric comprising a plurality of continuous syndiotactic polypropylene fibers, said syndiotactic polypropylene consisting of a polymer chain of blocks of repeating racemic dyads predominantly connected by meso triads, said polypropylene having a melting point of from about 100° C. to about 160° C., and having at least 65% recovery 24 hours after the syndiotactic fibers were elongated to 100%.

11. The syndiotactic polypropylene fibers of claim 8, wherein said fibers are in the form of monofilaments.

12. The syndiotactic polypropylene fibers of claim 8, wherein said fibers are in the form of a yarn.

13. The syndiotactic polypropylene fibers of claim 8, wherein said fibers are in the form of a staple fibers.

14. The syndiotactic polypropylene fibers of claim 8, wherein said fibers are in the form of a tow.

15. The syndiotactic polypropylene fibers of claim 8, wherein said polymer chain has an average molecular weight of between about 50,000 and about 200,000.

16. The syndiotactic polypropylene fibers of claim 8, wherein said polymer chain has an average molecular weight of between about 50,000 and about 300,000.

* * * * *